US012710726B2

(12) United States Patent
Zhang

(10) Patent No.: US 12,710,726 B2
(45) Date of Patent: Aug. 18, 2026

(54) INNER ROLLER, TIME DISPLAY STRUCTURE AND TIMEPIECE

(71) Applicant: Donghong Zhang, Shenzhen (CN)

(72) Inventor: Donghong Zhang, Shenzhen (CN)

(*) Notice: Subject to any disclaimer, the term of this patent is extended or adjusted under 35 U.S.C. 154(b) by 275 days.

(21) Appl. No.: 18/735,771

(22) Filed: Jun. 6, 2024

(65) Prior Publication Data

US 2025/0138482 A1 May 1, 2025

(30) Foreign Application Priority Data

Oct. 27, 2023 (CN) ......................... 202311415772.7
Oct. 27, 2023 (CN) ......................... 202322907393.1
Oct. 27, 2023 (CN) ......................... 202322910672.3

(51) Int. Cl.
*G04B 19/21* (2006.01)
*G04B 19/02* (2006.01)

(52) U.S. Cl.
CPC ............. *G04B 19/02* (2013.01); *G04B 19/21* (2013.01)

(58) Field of Classification Search
CPC ...... G04B 19/02; G04B 19/21; G04B 19/205; G06B 1/163
USPC ...................................... 116/252; 368/26, 39
See application file for complete search history.

(56) References Cited

U.S. PATENT DOCUMENTS 209,618 A * 11/1878 Lewis .............. G04B 19/24313 368/39
441,443 A * 11/1890 Prentiss ............... G04B 19/205 368/39
2,559,211 A * 7/1951 Brunengraber ...... A44C 5/0015 40/518
2,596,370 A * 5/1952 Bush ..................... G06M 1/042 74/575
3,164,918 A * 1/1965 Brown .................. G06M 1/241 362/23.15
3,405,465 A * 10/1968 Edouard ................ G04B 19/21 40/503
3,518,825 A * 7/1970 Walter ............... G04B 19/2538 968/185
3,581,488 A * 6/1971 Robin ................ G04B 19/2432 968/203
3,616,342 A * 10/1971 Lenz ......................... C25F 1/04 205/710
3,823,552 A * 7/1974 Boyles .................. G04B 19/21 368/222
3,883,968 A * 5/1975 Suzuki .................. G04B 19/00 40/541

(Continued)

*Primary Examiner* — Sean Kayes

(57) ABSTRACT

Disclosed are an inner roller, a time display structure and a timepiece. The inner roller includes a rotating rod and a plurality of rotating wheels, the plurality of rotating wheels are provided on the rotating rod at intervals, each of the rotating wheels is provided with numbers, the numbers on the plurality of rotating wheels are different and there are twelve numbers in total. The described inner roller can be used in cooperation with an outer barrel of a timepiece, so that the number of a certain rotating wheel on the inner roller at a certain time can be displayed by a window, so as to complete the display of time (the time can be hour or minute). The time display structure includes an outer barrel and the described inner roller. The timepiece includes a movement including the described time display structure.

20 Claims, 5 Drawing Sheets

(56) References Cited

U.S. PATENT DOCUMENTS 3,922,848 A * 12/1975 Weber .................... G04B 19/21
235/117 R

* cited by examiner

INNER ROLLER, TIME DISPLAY STRUCTURE AND TIMEPIECE

TECHNICAL FIELD

The present invention relates to the technical field of timing, in particular to an inner roller, a time display structure and a timepiece.

BACKGROUND

In the field of timing, a timepiece is an essential device, and generally, according to a power mode of the timepiece, the timepiece can be divided into an electronic meter and a mechanical meter.

With the development of the society, the appearance style of a timepiece is various, but cannot depart from the described two kinds of timepieces, and cannot meet different requirements.

Therefore, it is necessary to develop a new timepiece, which has a structure completely different from that of a conventional timepiece and satisfies different requirements.

SUMMARY

In order to solve the described problem existing in the prior art, the present invention aims to provide an inner roller, a time display structure and a timepiece.

The technical solution adopted in the present invention is: an inner roller, applied to a timepiece, the inner roller including a rotating rod and a plurality of rotating wheels, the plurality of rotating wheels being provided on the rotating rod at intervals, each rotating wheel being provided with numbers, the numbers on the plurality of rotating wheels being different and there being twelve numbers in total.

The described inner roller can be used in cooperation with an outer barrel of a timepiece, so that the number of a certain rotating wheel on the inner roller at a certain time can be displayed by an outer barrel, so as to complete the display of time (the time can be hour or minute).

In some embodiments, there are n rotating wheels, and 12/n numbers are provided on the outer circumference of each of the rotating wheels, wherein n and 12/n are integers and greater than or equal to 2, the quantity of the numbers on the plurality of rotating wheels is equal, a difference value between two adjacent numbers on each rotating wheel is equal, and in an extending direction of the rotating rod, the value of the corresponding numbers on the first to nth rotating wheels gradually increases or decreases.

In some embodiments, the rotation angle of two adjacent numbers on each of the rotating wheels is 360°/n.

In some embodiments, the rotation angle of the numbers at the corresponding positions of two adjacent rotating wheels is 30°.

In some embodiments, there are four rotating wheels, three numbers are marked at the outer circumference of each of the rotating wheels, in the direction from left to right of the rotating rod, the numbers "1, 5, 9" are respectively marked on the first rotating wheel, the numbers "2, 6, 10" are respectively marked on the second rotating wheel, the numbers "3, 7, 11" are respectively marked on the third rotating wheel, the numbers "4, 8, 12" are respectively marked on the fourth rotating wheel, the rotation angle of two adjacent numbers on each of the rotating wheels is 120°, and the rotation angle of the numbers at the corresponding positions of two adjacent rotating wheels is 30°. Thus, twelve numbers can be allocated to four groups of rotating wheels, the numbers allocated to the four groups of rotating wheels are more reasonable, and the sizes of the numbers can also be adapted to actual use, so that a good state of time display can be achieved.

In some embodiments, there are three rotating wheels, four numbers are marked at the outer circumference of each of the rotating wheels, in the direction from left to right of the rotating rod, the numbers "1, 4, 7, 10" are respectively marked on the first rotating wheel, the numbers "2, 5, 8, 11" are respectively marked on the second rotating wheel, the numbers "3, 6, 9, 12" are respectively marked on the third rotating wheel, the rotation angle of two adjacent numbers on each of the rotating wheels is 90°, and the rotation angle of the numbers at the corresponding positions of two adjacent rotating wheels is 30°. Thus, twelve numbers can be allocated to three groups of rotating wheels, the numbers allocated to the three groups of rotating wheels are more reasonable, and the sizes of the numbers can also be adapted to actual use, so that a good state of time display can be achieved.

In some embodiments, positioning screws are further included, the connecting portions of the rotating wheels are provided with screw holes, the corresponding positions of the rotating rod are also provided with positioning holes, and the positioning screws pass through the screw holes and are provided in the positioning holes.

In some embodiments, the inner roller is made of aluminum alloy.

A time display structure, applied to a timepiece, including an outer barrel and an inner roller, wherein the inner roller is provided in the outer barrel, the inner roller includes a rotating rod and a plurality of rotating wheels, the plurality of rotating wheels are provided on the rotating rod at intervals, each rotating wheel is provided with numbers, the numbers on the plurality of rotating wheels are different and there being twelve numbers in total, and the outer barrel is used for displaying a number on the inner roller.

In the described time display structure, by using the outer barrel in cooperation with the inner roller, the number of a certain rotating wheel on the inner roller at a certain time can be displayed by an outer barrel, so as to complete the display of time (the time can be hour or minute).

In some embodiments, the time display structure further includes a driving device, the driving device is respectively connected to the inner roller and the outer barrel, and the driving device can drive the outer barrel and the inner roller to rotate in opposite directions and at different rotation speeds, so that different numbers on the inner roller can coincide with windows on the outer barrel at different times and only one number is displayed in each window.

In some embodiments, the outer barrel is provided with the windows at positions corresponding to the rotating wheels, the rotation angle between two adjacent windows is 90°, the windows of the outer barrel coincide with the numbers of the inner rollers, and only one number is displayed in each window.

In some embodiments, the driving device includes a first driving motor and a gear reducer set, the first driving motor is connected to the gear reducer set, the first driving motor can drive the gear reducer set to move, and the gear reducer set can drive the outer barrel and the inner roller to rotate in opposite directions and at different rotation speeds. In some embodiments, the gear reducer set includes a first transmission gear, a second transmission gear, a third transmission gear and a fourth transmission gear, the first transmission gear is connected to the first driving motor, the second transmission gear, the third transmission gear and the fourth transmission gear are in sequential transmission, the outer barrel is coaxially connected to a sixth transmission gear, the inner roller is coaxially connected to a fifth transmission gear, the third transmission gear is fitted with the fifth transmission gear, the fourth transmission gear is fitted with the sixth transmission gear, and by a transmission ratio between the third transmission gear and the fifth transmission gear and a transmission ratio between the fourth transmission gear and the sixth transmission gear, the outer barrel and the inner roller are rotated in opposite directions and at different rotation speeds.

A timepiece, including a movement, wherein the movement includes a time display structure, the time display structure including an outer barrel and an inner roller, the inner roller is provided in the outer barrel, the inner roller includes a rotating rod and a plurality of rotating wheels, the plurality of rotating wheels are provided on the rotating rod at intervals, each rotating wheel is provided with numbers, the numbers of the plurality of rotating wheels are different and there are twelve numbers in total, and the outer barrel is used for displaying a number on the inner roller.

In the described timepiece, by using the outer barrel in cooperation with the inner roller in the movement, the number of a certain rotating wheel on the inner roller at a certain time can be displayed by an outer barrel, so as to complete the display of time (the time can be hour or minute).

In some embodiments, the time display structure further includes a driving device, the driving device is respectively connected to the inner roller and the outer barrel, and the driving device can drive the outer barrel and the inner roller to rotate in opposite directions and at different rotation speeds, so that different numbers on the inner roller can coincide with windows on the outer barrel at different times and only one number is displayed in each window.

In some embodiments, the movement further includes a lead screw structure, the timepiece further includes a frame, the outer barrel, the inner roller, the driving device and the lead screw structure are all provided on the frame, the outer barrel is provided with the windows at positions corresponding to the plurality of rotating wheels, respectively, the rotation angle between two adjacent windows is 90°, the windows of the outer barrel coincide with the numbers of the inner rollers and only one number is displayed by each window and the frame, and lead screw structure can indicate time.

In some embodiments, a light reflection sensor is further included, an end of the outer barrel is provided with a light-blocking end cover, a round hole is formed in the light-blocking end cover, a light-blocking sheet is provided at an end of the inner roller, a notch is provided on the light-blocking sheet, and the light reflection sensor can receive light reflected by itself through the notch.

In some embodiments, the lead screw structure includes a second driving motor, a lead screw, and a pointer nut, the pointer nut is sleeved on the lead screw, the second driving motor can drive the lead screw to rotate, the lead screw drives the pointer nut to move, the motor can be reversed, and the pointer nut can indicate time.

In some embodiments, the frame is provided with a time indication scale, and the corresponding numbers are marked on the indication scale.

In some embodiments, the frame is mounted within a watch housing, the watch housing can cover the movement, and a watch band is also provided on the watch housing.

Figure 1:
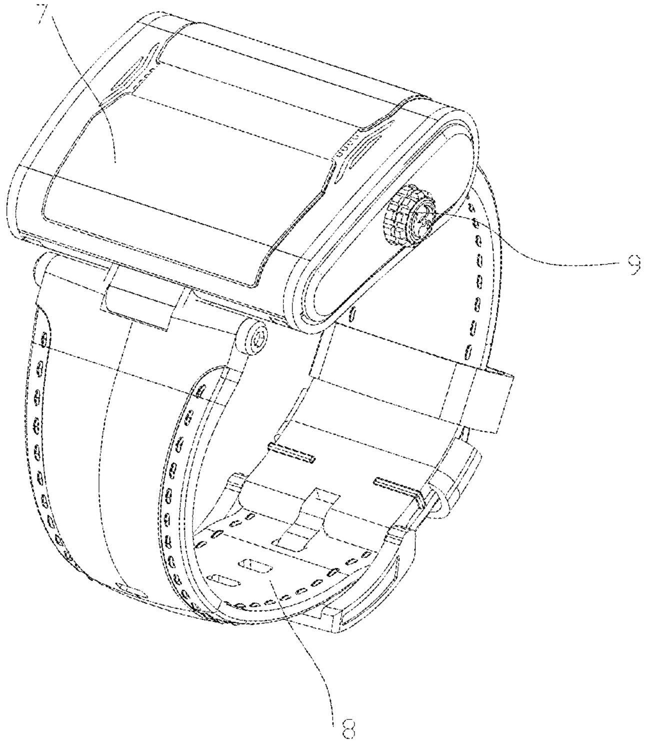
FIG. 1 is a schematic structural diagram of a new timepiece according to an embodiment of the present invention.

In the drawings: 1—outer barrel; 11—window; 12—light-blocking end cover; 121—round hole; 2—inner roller; 21—rotating rod; 211—positioning hole; 22—rotating wheel; 221—arc-shaped sheet; 23—light-blocking sheet; 231—notch; 24—positioning screw; 3—driving device; 31—first driving motor; 32—gear reducer set; 321—first transmission gear; 322—second transmission gear; 323—third transmission gear; 324—fourth transmission gear; 325—fifth transmission gear; 326—fifth transmission gear; 4—lead screw structure; 41—second driving motor; 42—lead screw; 43—pointer nut; 5—frame; 51—indication scale; 6—light reflection sensor; 7—watch housing; 8—watch band; 9—crown.

DETAILED DESCRIPTION

The technical solutions in the embodiments of the present invention will be clearly and completely described as follows with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall belong to the scope of protection of the present invention.

Unless otherwise defined, all technical and scientific terms used herein have the same meanings as those generally understood by those skilled in the art of the present invention. The terms used herein in the description of the present invention are for the purpose of describing particular examples only and are not intended to limit the present invention. As used herein, the term "and/or" includes any and all combinations of one or more of the associated listed items.

FIGS. 1 to 10 schematically show a structure of a timepiece according to an embodiment of the present invention.

A timepiece, including a movement, the movement including an outer barrel 1, an inner roller 2, a driving device 3 and a lead screw structure 4. In addition, the timepiece may further include a watch housing 7 and a watch band 8, but is not limited thereto.

Figure 2:
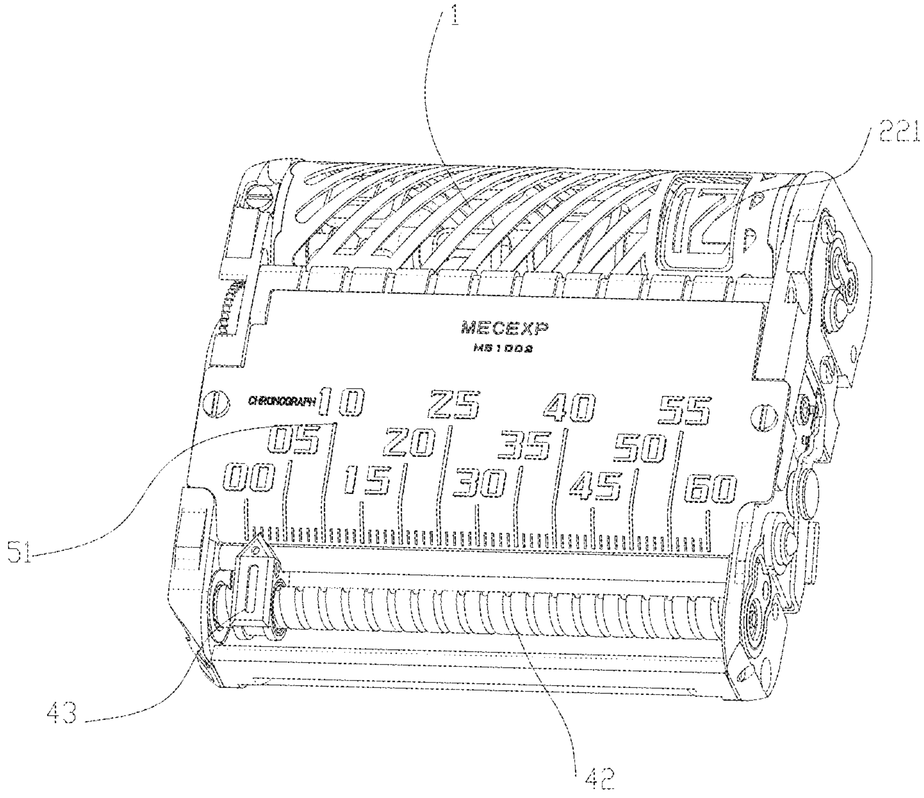
FIG. 2 is a schematic structural diagram of a movement and a frame in the new timepiece shown in FIG. 1.
Figure 3:
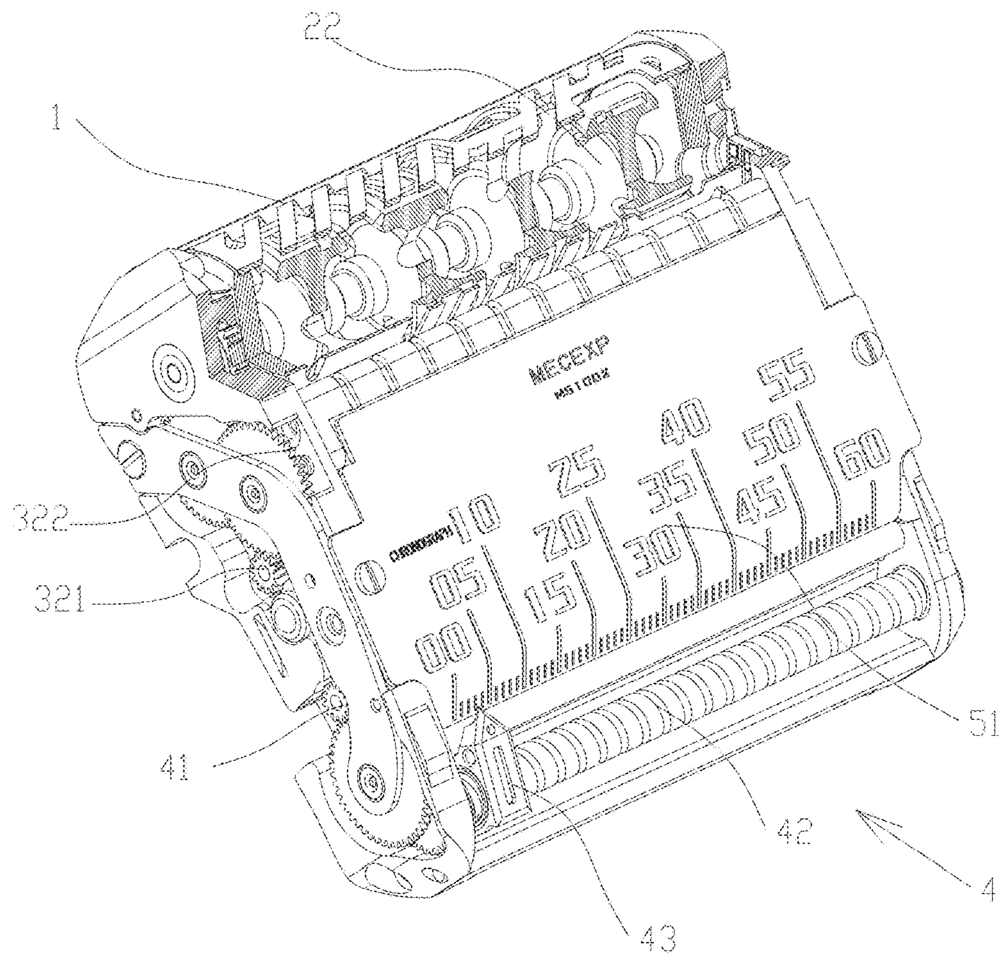
FIG. 3 is another schematic structural diagram of a movement and a frame in the new timepiece shown in FIG. 1.
Figure 4:
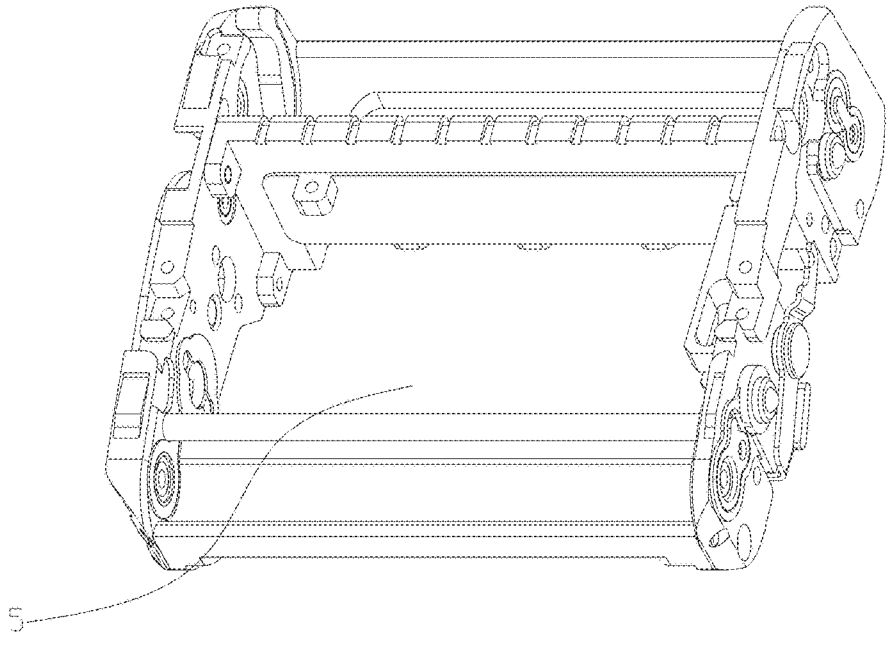
FIG. 4 is a schematic structural diagram of a frame in the new timepiece shown in FIG. 1.

As shown in FIGS. 2 and 3, the inner roller 2 can be mounted in the outer barrel 1, and the driving device 3 can drive the outer barrel 1 and the inner roller 2 to rotate in opposite directions and at different rotational speeds, so that different numbers on the inner roller 2 can coincide with windows 11 of the outer barrel 1 at different times. As numbers are provided on the inner roller 2, only the number corresponding to the window 11 is displayed at the same time, a certain time can be displayed by numbers, and in addition, the lead screw 42 is located below the outer barrel 1 and the inner roller 2, and the lead screw structure 4 can also be used to indicate time.

The described outer barrel 1 and inner roller 2 can display “hour” and “minute”, and the screw rod 42 can indicate “minute” and “second”. A specific display manner is described later.

Figure 5:
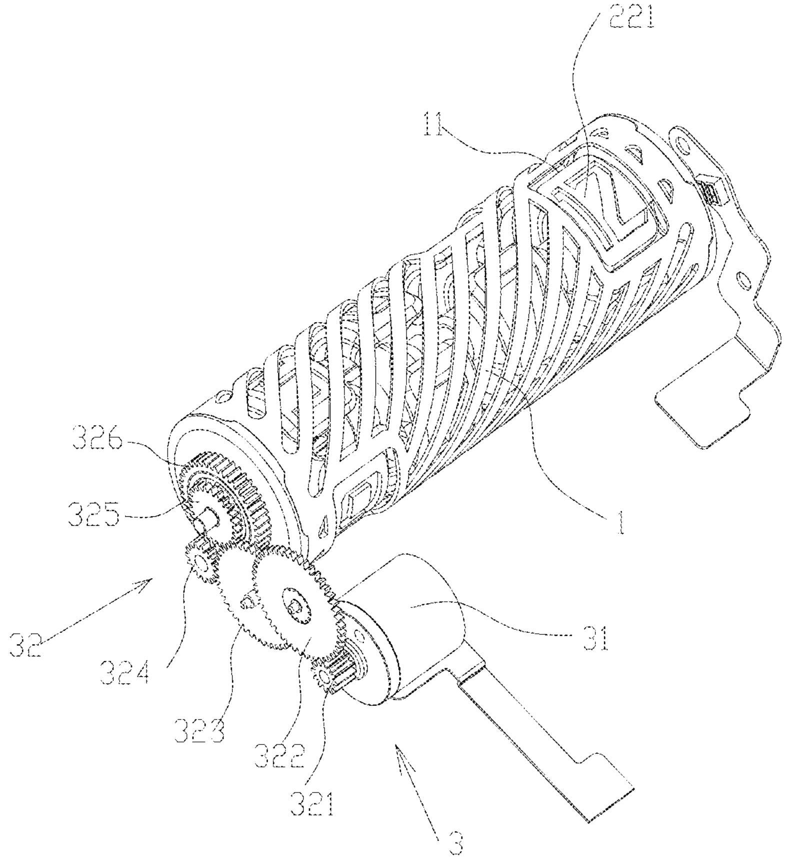
FIG. 5 is a schematic diagram of a part of the structure of the new timepiece shown in FIG. 1.
Figure 6:
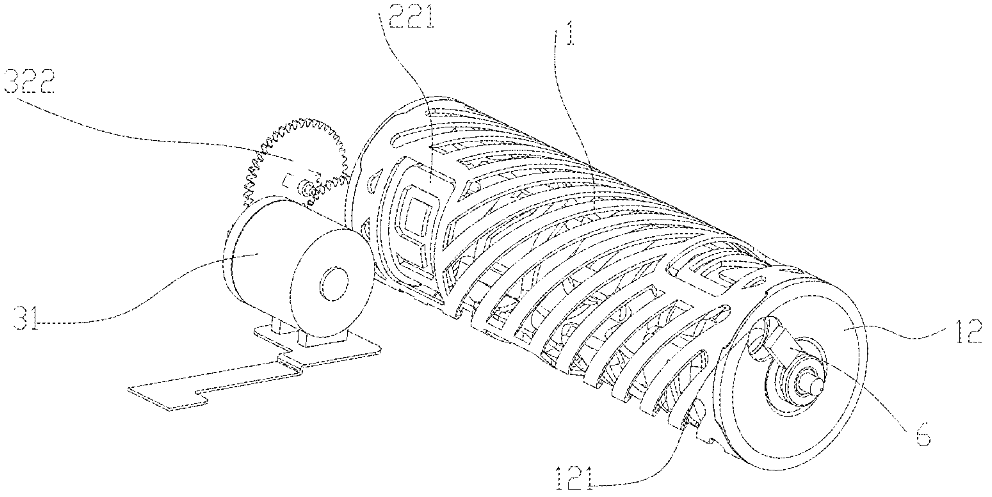
FIG. 6 is a schematic structural diagram of a part of the structure of the new timepiece shown in FIG. 5 in another direction.
Figure 7:
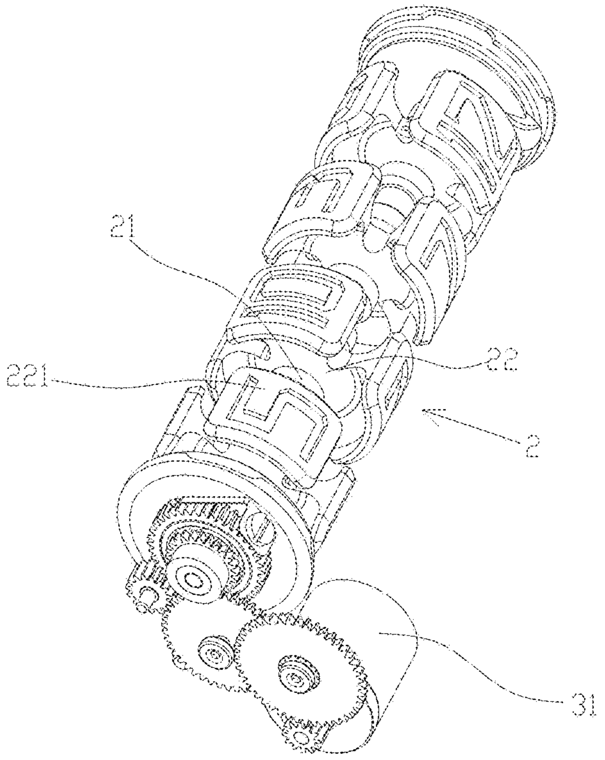
FIG. 7 is a structural schematic diagram of a part of the structure of the new timepiece shown in FIG. 5 after an outer barrel is hidden.
Figure 8:
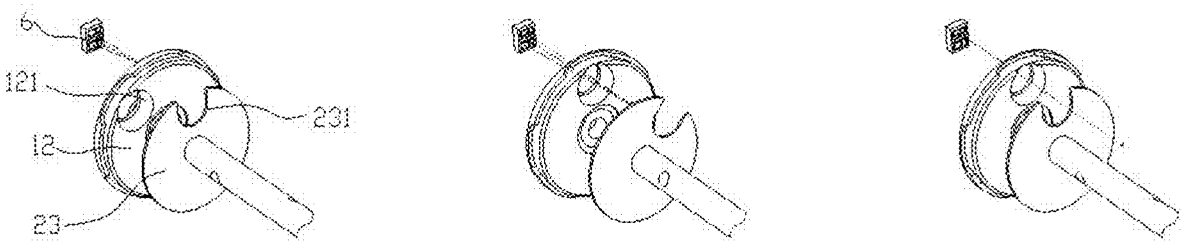
FIG. 8 is a schematic structural diagram of a zeroing component of a new timepiece shown in FIG. 1.

In this example, as shown in FIG. 5 to FIG. 7, the driving device 3 includes a first driving motor 31 and a gear reducer set 32. The first driving motor 31 is connected to the gear reducer set 32, the first driving motor 31 can drive the gear reducer set 32 to move, and the gear reducer set 32 can drive the outer barrel 1 and the inner roller 2 to rotate in opposite directions and at different rotation speeds. By the same driving motor and the transmission ratio of the gear reducer set 32 and the outer barrel 1 and the inner roller 2, different numbers on the inner roller 2 coincide with the windows 11 on the outer barrel 1 at different times, and the numbers corresponding to the windows 11 are displayed, thereby achieving the purpose of displaying time.

The specific structure of the gear reducer set 32 will be described in detail below. In this example, the gear reducer set 32 includes a first transmission gear 321, a second transmission gear 322, a third transmission gear 323 and a fourth transmission gear 324, the first transmission gear 321 is connected to the first driving motor 31, and the second transmission gear 322, the third transmission gear 323 and the fourth transmission gear 324 are in sequential transmission. In fact, the second transmission gear 322 includes a large gear and a small gear, and the large gear is fitted with the first transmission gear 321, and the inner small gear is fitted with the third transmission gear 323.

In addition, it can be determined from FIG. 5 and FIG. 7 that a fifth transmission gear 325 is coaxially connected to the inner roller 2, a sixth transmission gear 326 is coaxially connected to the outer barrel 1, and the third transmission gear 323 is fitted with the fifth transmission gear 325, the fourth transmission gear 324 is fitted with the sixth transmission gear 326. It can be determined from FIG. 5 and FIG. 7 that when the third transmission gear 323 rotates, the fourth transmission gear 324 can be driven to rotate, the fifth transmission gear 325 can also be driven to rotate at the same time, the rotation direction of the fifth transmission gear 325 is opposite to the rotation direction of the third transmission gear 323, the fourth transmission gear 324 can drive the sixth transmission gear 326 to rotate, the rotation direction of the sixth transmission gear 326 is the same as the rotation direction of the third transmission gear 323, and as the tip diameter of the sixth transmission gear 326 is larger than that of the fifth transmission gear 325, the rotation speed of the sixth transmission gear 326 may be less than that of the fifth transmission gear 325, and the rotation directions of the sixth transmission gear 326 and the fifth transmission gear 325 are opposite.

Therefore, by the specific arrangement of the described transmission gear set, the transmission ratio of the third transmission gear 323 and the fifth transmission gear 325, and the transmission ratio of the fourth transmission gear 324 and the sixth transmission gear 326 cause the outer barrel 1 and the inner roller 2 to rotate at different rotation speeds in opposite directions. By the gear reducer set 32 having such a specific structure, i.e. setting the transmission ratio of the third transmission gear 323 and the fifth transmission gear 325, and the transmission ratio of the fourth transmission gear 324 and the sixth transmission gear 326, so as to achieve the purpose that different numbers coincide with the windows 11 of the outer barrel 1 at different times. The current time is displayed by numbers.

In addition, in other examples, the structure of the gear reducer set 32 is not limited to the described manner, and may also be a structure composed of a plurality of other gears. Regardless of the form of the gear reducer set 32, as long as the final purpose of the gear reducer set 32 is to rotate the inner roller 2 and the outer barrel 1 in opposite directions and at different speeds, so as to finally present the numbers, i.e. display the time corresponding to the numbers, it is within the scope of protection of the present application. In addition, a person skilled in the art should know that the quantity of gears in the gear reducer set 32 and a corresponding transmission ratio can be set according to practical situations.

In this example, as shown in FIG. 7, the inner roller 2 includes a rotating rod 21 and a plurality of rotating wheels 22 marked with numbers, the plurality of rotating wheels 22 are provided on the rotating rod 21 at intervals, the plurality of groups of rotating wheels 22 are integrally formed with numbers, and the numbers on the plurality of rotating wheels 22 are different and there are twelve numbers in total.

There are n rotating wheels 22, and 12/n numbers are provided on the outer circumference of each of the rotating wheels 22, wherein n and 12/n are integers and greater than or equal to 2, the quantity of the numbers on the plurality of rotating wheels 22 is equal, a difference value between two adjacent numbers on each rotating wheel 22 is equal, and in an extending direction of the rotating rod 21, the value of the corresponding numbers on the first to nth rotating wheels gradually increases or decreases. The rotation angle of two adjacent numbers on each of the rotating wheels is 360°/n. The rotation angle of the numbers at the corresponding positions of two adjacent rotating wheels is 30°.

In this example, the value of n is 4, there are four rotating wheels 22, and the outer circumference of each rotating wheel 22 is provided with three numbers. Specifically, as shown in FIG. 7, each turning wheel 22 is provided with three arc-shaped sheets 221, each arc-shaped sheet 221 is marked with numbers, in the direction from left to right of the rotating rod 21, the numbers “1, 5, 9” are marked on the first rotating wheel 22, the numbers “2, 6, 10” are marked on the second rotating wheel 22, the numbers “3, 7, 11” are marked on the third rotating wheel 22, the numbers “4, 8, 12” are marked on the fourth rotating wheel 22, the rotation angle of two adjacent arc-shaped sheets 221 on each of the rotating wheels 22 is 120°, and in addition, the rotation angle of the arc-shaped sheets 221 at the corresponding positions of the two adjacent rotating wheels 22 is 30°, that is, as shown in FIG. 7, the rotation angle between the arc-shaped sheet 221 marked with the number “5” and the arc-shaped sheet 221 marked with the number “10” is 30°.

As will be described in detail hereinafter, on the first rotating wheel 22 from left, the rotation angle between the arc-shaped sheet 221 marked with the number “9” and the arc-shaped sheet 221 marked with the number "5" is 120°, the rotation angle between the arc-shaped sheet 221 marked with the number "5" and the arc-shaped sheet 221 marked with the number "1" is 120°, and the rotation angle between the arc-shaped sheet 221 marked with the number "1" and the arc-shaped sheet 221 marked with the number "9" is 120°. The described rotation angle refers to an angle of clockwise rotation of the inner roller 2 when viewed from left to right. By the same reasoning, the rotation angles of the numerals on the second rotating wheel 22, the third rotating wheel 22, and the fourth rotating wheel 22 can be deduced.

In FIG. 7, the rotation angle between the arc-shaped sheet 221 marked with the number "5" and the arc-shaped sheet 221 marked with the number "10" is 30°, and it can be determined that the rotation angle between the arc-shaped sheet 221 marked with the number "9" and the arc-shaped sheet 221 marked with the number "5" is 120°; therefore, the rotation angle between the arc-shaped sheet 221 marked with the number "9" and the arc-shaped sheet 221 marked with the number "10" is 150°. By the same reasoning, it can be deduced that the rotation angle between the arc-shaped sheets 221 marked with two adjacent numbers is 150°, for example, the rotation angle between the arc-shaped sheet 221 marked with the number "1" and the arc-shaped sheet 221 marked with the number "2" is 150°. The described rotation angle refers to an angle of clockwise rotation of the inner roller 2 when viewed from left to right.

That is, the roller 2 is rotated by 150° at every time interval, i.e. from number "1" to number "2". The twelve numbers can be allocated to four groups of rotating wheels 22, the numbers allocated to the four groups of rotating wheels 22 are more reasonable, and the sizes of the numbers can also be adapted to actual use, so that a good state of time display can be achieved.

In other examples, the quantity of rotating wheels 22 may also be three, two, six, or the like. In addition, when there are three rotating wheels 22, four numbers may be marked on each of the rotating wheels 22, and when there are two rotating wheels 22, six numbers may be marked on each of the rotating wheels 22. The quantity of rotating wheels 22 can be designed according to actual needs, and the design of each number on the rotating wheels 22 and the design of the angle of the arc-shaped sheet 221 can be correspondingly changed according to the described content.

For example, when there are three rotating wheels 22, each rotating wheel 22 is provided with four arc-shaped sheets 221, each arc-shaped sheet 221 is marked with numbers, in the direction from left to right of the rotating rod 21, the numbers "1, 4, 7, 10" are marked on the first rotating wheel, the numbers "2, 5, 8, 11" are marked on the second rotating wheel 22, the numbers "3, 6, 9, 12" are marked on the third rotating wheel 22, the rotation angle of two adjacent numbers on each of the rotating wheels 22 is 90°, and the rotation angle of the numbers at the corresponding positions of two adjacent rotating wheels 22 is 30°.

For example, when there are two rotating wheels 22, each rotating wheel 22 is provided with six arc-shaped sheets 221, and each arc-shaped sheet 221 is marked with numbers, in the direction from left to right of the rotating rod 21, the numbers "1, 3, 5, 7, 9, 11" are marked on the first rotating wheel, the numbers "2, 4, 6, 8, 10, 12" are marked on the second rotating wheel, the rotation angle of two adjacent numbers on each of the rotating wheels 22 is 60°, and the rotation angle of the numbers at the corresponding positions of two adjacent rotating wheels is 30°.

In this example, each of the rotating wheels 22 is of a round wheel-shaped structure as a whole, and the rotating wheels 22 of this structure can cooperate with the rotating rod 21.

Figure 9:
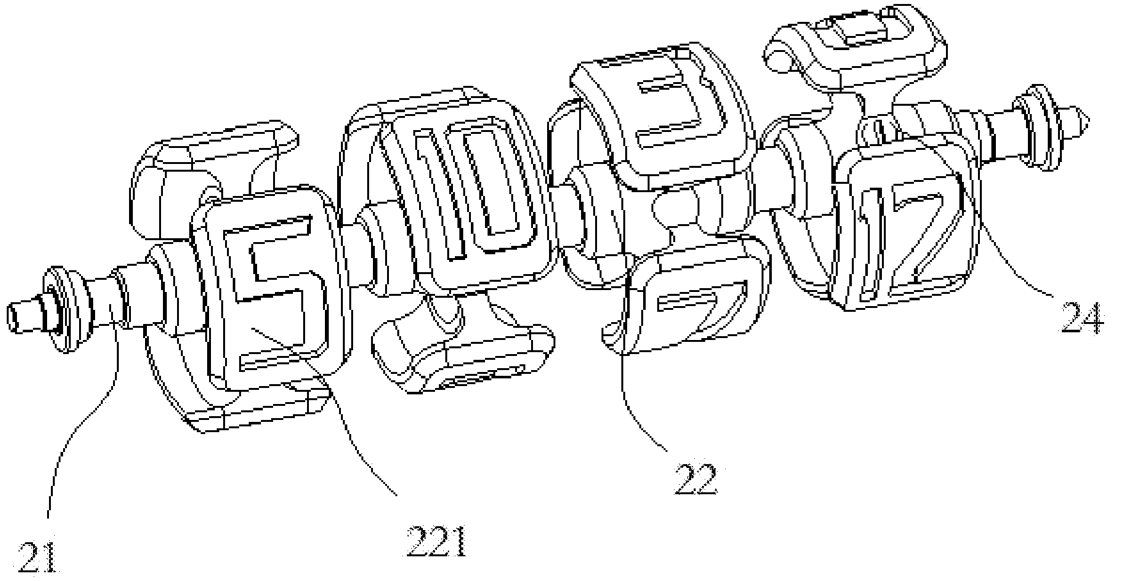
FIG. 9 is a schematic diagram of an inner roller of FIG. 7.
Figure 10:
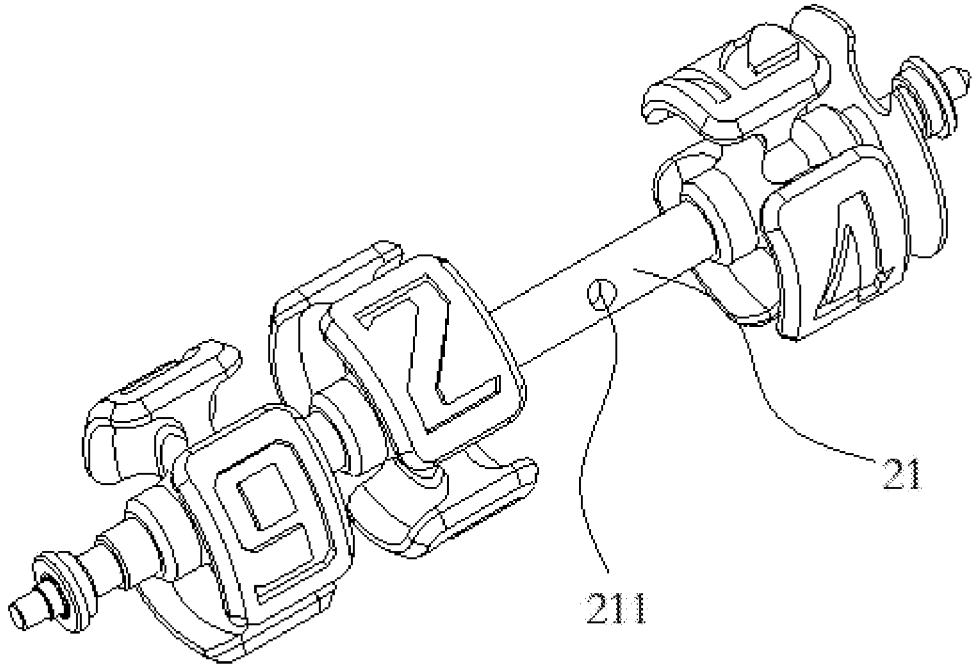
FIG. 10 is a schematic structural diagram of the inner roller shown in FIG. 9 after one of the rotating wheels is hidden.

Please refer to FIGS. 9 and 10, in this example, the inner roller 2 further includes positioning screws 24, the rotating wheels 22 are provided with screw holes, the corresponding positions of the rotating rod 21 are also provided with positioning holes 211, and the positioning screws 24 pass through the screw holes and are provided in the positioning holes 211, the rotating wheels 22 can be fixed on the rotating rod 21 by the positioning screws 24, and the rotating wheels 22 can rotate together with the rotating rod 21.

In this example, the inner roller 20 is made of aluminum alloy.

In this example, the timepiece further includes a frame 5, the outer barrel 1, the inner roller 2, the driving device 3 and the lead screw structure 4 can all be mounted on the frame 5, the outer barrel 1 is of a hollow structure, four windows 11 are integrally formed at corresponding positions of the outer barrel 1, and the rotation angle between two adjacent windows 11 is 90°. At a certain time, the numbers on the rotating wheels 22 are correspondingly displayed by the windows 11 of the outer barrel 1, and only one number is displayed in each window 11.

In fact, most part of the structure of the outer barrel 1 serves to block the numbers on the inner roller 2, so that the windows 11 coincide with the numbers on the inner roller 2 at the same time, only one number is displayed corresponding to each window 11, and the number displayed in the window 11 represents the current time. In other example, the structure of the frame 5 is not limited to that shown in FIG. 1 to FIG. 4, as long as the frame 5 can be used for fixedly mounting the outer barrel 1, the inner roller 2, the driving device 3 and the lead screw structure 4. One of the numbers of the inner roller 2 may be displayed by a corresponding window 11 of the outer barrel 1.

Hereinafter, the time display mode of the present invention will be described in detail with reference to the solution that there are four rotating wheels 22 on the inner roller 2, i.e. there are four rotating wheels 22 and four windows 11, at a certain time, the numbers on the four rotating wheels 22 of the inner roller 2 coincide with the windows 11 of the outer barrel 1. However, only one number is displayed by a corresponding window 11 of the outer barrel 1. Specifically, when the user wears the timepiece of the present invention, when raising the wrist, the displayed number can be seen under normal conditions of eyes (usually when looking at the watch in a front direction) (of course, the display described here is different from the display of the electronic watch, and it is the physical numbers on the inner roller 2 that are displayed), and other three numbers coinciding with the windows 11 are blocked by the frame 1.

Of course, if the other three numbers are not blocked by the frame 1, in use, the numbers in front of a person's eyes may be considered as displayed numbers, that is, one of the numbers of the inner roller 2 is displayed by a corresponding window 11 of the outer barrel 1, and the other numbers which are not in front of the person's eyes may be considered as numbers which are not displayed.

In this example, the present invention further includes a light reflection sensor 6, an end of the outer barrel 1 is provided with a light-blocking end cover 12, a round hole 121 is integrally formed on the light-blocking end cover 12, a light-blocking sheet 23 is mounted at an end of the inner roller 2, a U-shaped notch 231 is mounted on the light-blocking sheet 23, the light reflection sensor 6 can receive light reflected by itself, and the zeroing effect can be achieved by the light reflection sensor 6, so as to achieve different functions.

Specifically, zeroing is performed as follows: when the light emitted by the light reflection sensor 6 successively passes through the round hole 121 on the light-blocking end cover 12 and the U-shaped notch 231 on the light-blocking sheet 23, the light is not reflected back, and at this time, zeroing is performed, that is, as shown in FIG. 2, the number “12” coincides with the corresponding window 11 (zero point). On the contrary, when the light emitted by the light reflection sensor 6 does not pass through the round hole 121 on the light-blocking end cover 12 and the U-shaped notch 231 on the light-blocking sheet 23, the light is reflected back, and zeroing is not performed at this time. Zeroing is primarily used to regulate different functions of the present invention.

In this example, as shown in FIG. 2 and FIG. 3, the lead screw structure 4 includes a second driving motor 41, a lead screw 42 and a pointer nut 43, the pointer nut 43 is sleeved on the lead screw 42, and the second driving motor 41 can drive the lead screw 42 to rotate. Definitely, a speed reduction gear is also provided between the motor and the lead screw 42, the lead screw 42 drives the pointer nut 43 to move, the motor can be reversed, and the pointer nut 43 can indicate time, finally, the pointer nut 43 can be driven to move by the second driving motor 41, and when the pointer nut 43 moves to different positions, different times may be indicated.

As shown in FIG. 2 and FIG. 3, a time indication scale 51 is provided on the frame 5, numbers are marked on the corresponding scale, and the current time can be clearly displayed by the indication scale 51.

As shown in FIG. 1, a frame 5 is mounted in a watch housing 7, the watch housing 7 can cover a movement, a watch band 8 is further provided on the watch housing, and the watch housing 7 has the function of covering the movement and protecting the movement.

The overall different functions of the present invention are described in detail as follows: 1. a conventional timekeeping function, for example, when the current time is “1” o’clock, that is, the arc-shaped sheet 221 marked with the number “1” coincides with the first window 11 from left of the outer barrel 1, and the user can see the number “1”. After one hour, the first driving motor 31 is started, and the first driving motor 31 finally drives the inner roller 2 to rotate 150° clockwise, at the same time, the outer barrel 1 rotates anticlockwise by 90°, and at this time, the arc-shaped sheet 221 marked with the number “2” coincides with the second window 11 from left of the outer barrel 1. The described inner roller 2 and outer barrel 1 achieve the function of displaying “hour” (number “1” is displayed at each time when the current time is 1 o’clock to 2 o’clock, number “2” is displayed at each time when the current time is 2 o’clock to 3 o’clock, and so on)

The pointer nut 43 on the lead screw structure 4 has the function of correspondingly indicating “minute”, equivalent to the function of displaying “minute” of time.

2. Zeroing of the timekeeping function: after pressing a zeroing button, the outer barrel 1 and the inner roller 2 rotate at the same time, after rotating a certain angle, when the light emitted by the light reflection sensor 6 passes through the round hole 121 on the light-blocking end cover 12 and the U-shaped notch 231 on the light-blocking sheet 23 in sequence, the light is not reflected back, and at this time, zeroing is performed, and the fourth window 11 from left of the outer barrel 1 coincides with number “12” marked on the arc-shaped sheet, so as to indicate (zero point).

3. A timing function: the crown 9 is continuously pressed three times within two seconds to start the timing function, and the motor drives the pointer nut 43 of the lead screw structure 4 to quickly move to the left-most zero point of the time indication scale 51, the outer barrel 1 and the inner roller 2 rotate at the same time, and when the outer barrel 1 and the inner roller 2 rotate by a certain angle, the light emitted by the light reflection sensor 6 passes through the round hole 121 on the light-blocking end cover 12 and the U-shaped notch 231 on the light-blocking sheet 23 in sequence, the light is not reflected back, and at this time, zeroing is performed, the fourth window 11 from left of the outer barrel 1 coincides with number “12” marked on the arc-shaped sheet to display the number, the crown 9 is then pressed once more to start timing, and the pointer nut 43 on the lead screw structure 4 correspondingly runs in the form of “second”. When the pointer nut 43 rapidly returns to the zero point of the time indication scale 51 when it runs 60 seconds, the outer barrel 1 and the inner roller 2 rotate simultaneously, and the arc-shaped sheet 221 marked with number “1” coincides with the first window 11 from left of the outer barrel 1 to display the number, equivalent to timing for 1 minute; with this accumulation, the crown 9 is pressed once again to stop the timing, and at this time, the number reading displayed in the window 11 on the outer barrel 1 is taken as minute, then the corresponding scale of the pointer nut 43 on the lead screw structure 4 indicates that the reading there of is second, and the sum of the timed minute and second is equal to the timed duration, for example, if the number reading displayed in the window 11 on the outer barrel 1 is “8”, and the corresponding scale of the pointer nut 43 indicate that the reading is “10”, then the timed duration is 8 minutes and 10 seconds.

The process of operating the functions of the present invention can also be made as follows by setting:

- continuously pressing the crown for four times in 2 seconds to enter a time calibration mode;
- continuously pressing the crown for three times in 2 seconds to enter a timing function mode;
- continuously pressing the crown twice in 1 second to enter a power search (test) mode; and
- pressing the crown for a long time for 4 seconds to enter a sleep mode.

In the timepiece of the present invention, a transmission ratio is set so that the numbers of the arc-shaped sheets 221 on the roller 2 are displayed by the windows 11 at a certain time, i.e. the display of the time is completed, the time may be hour and minute, and the scale 51 may be indicated by the movement of the pointer nut 43, i.e. a corresponding time may be indicated, and the time can be minute and second.

In addition, by the light reflection sensor 6, the effect of zeroing can be achieved, so that the outer barrel 1 and the inner roller 2 achieve different functions for displaying time.

The present invention is not limited to the described optional embodiments, and any person may obtain other products in various forms with the motivation of the present invention; however, no matter whether any change is made to the shape or structure thereof, any technical solution belonging to the scope defined in the claims of the present invention belongs to the scope of protection of the present invention.

The invention claimed is:

1. An inner roller, wherein the inner roller is applied to a timepiece, the inner roller comprises a rotating rod and a plurality of rotating wheels, the plurality of rotating wheels are provided on the rotating rod at intervals, each of the rotating wheels is provided with numbers, the numbers on the plurality of rotating wheels are different, and there are twelve numbers in total.

2. The inner roller according to claim 1, wherein there are n rotating wheels, and 12/n numbers are provided on the outer circumference of each of the rotating wheels, wherein n and 12/n are integers and greater than or equal to 2, the quantity of the numbers on the plurality of rotating wheels is equal, a difference value between two adjacent numbers on each of the rotating wheels is equal, and in an extending direction of the rotating rod, the magnitude of the corresponding numbers on the first rotating wheels to the nth rotating wheels gradually increases or decreases.

3. The inner roller according to claim 2, wherein the rotation angle of two adjacent numbers on each of the rotating wheels is 360°/n.

4. The inner roller according to claim 3, wherein the rotation angle of the numbers at the corresponding positions of two adjacent rotating wheels is 30°.

5. The inner roller according to claim 4, wherein there are four rotating wheels, three numbers are marked at the outer circumference of each of the rotating wheels; in the direction from left to right of the rotating rod, the numbers "1, 5, 9" are respectively marked on the first rotating wheel, the numbers "2, 6, 10" are respectively marked on the second rotating wheel, the numbers "3, 7, 11" are respectively marked on the third rotating wheel, the numbers "4, 8, 12" are respectively marked on the fourth rotating wheel, the rotation angle of two adjacent numbers on each of the rotating wheels is 120°, and the rotation angle of the numbers at the corresponding positions of two adjacent rotating wheels is 30°.

6. The inner roller according to claim 1, wherein there are three rotating wheels, four numbers are marked at the outer circumference of each of the rotating wheels; in the direction from left to right of the rotating rod, the numbers "1, 4, 7, 10" are respectively marked on the first rotating wheel, the numbers "2, 5, 8, 11" are respectively marked on the second rotating wheel, the numbers "3, 6, 9, 12" are respectively marked on the third rotating wheel, the rotation angle of two adjacent numbers on each of the rotating wheels is 90°, and the rotation angle of the numbers at the corresponding positions of two adjacent rotating wheels is 30°.

7. The inner roller according to claim 1, further comprising positioning screws, wherein the rotating wheels are provided with screw holes, positioning holes are provided on corresponding positions of the rotating rod, and the positioning screws pass through the screw holes and are mounted in the positioning holes.

8. The inner roller according to claim 1, wherein the inner roller is made of aluminum alloy.

9. A time display structure, comprising an outer barrel and an inner roller, wherein the inner roller is provided in the outer barrel, the inner roller comprises a rotating rod and a plurality of rotating wheels, the plurality of rotating wheels are provided on the rotating rod at intervals, each of the rotating wheels is provided with numbers, the numbers on the plurality of rotating wheels are different and there are twelve numbers in total, and the outer barrel is used for displaying one number on the inner roller.

10. The time display structure according to claim 9, further comprising a driving device, wherein the driving device is respectively connected to the inner roller and the outer barrel, and the driving device is capable of driving the outer barrel and the inner roller to rotate in opposite directions and at different rotation speeds, so that different numbers on the inner roller are capable of coincide with windows on the outer barrel at different times and only one number is displayed by each window.

11. The time display structure according to claim 10, wherein the outer barrel is provided with the windows at positions corresponding to the rotating wheels, the rotation angle between two adjacent windows is 90°, the windows of the outer barrel coincide with the numbers of the inner rollers, and only one number is displayed by each window.

12. The time display structure according to claim 11, wherein the driving device comprises a first driving motor and a gear reducer set, the first driving motor is connected to the gear reducer set, the first driving motor is capable of driving the gear reducer set to move, and the gear reducer set is capable of driving the outer barrel and the inner roller to rotate in opposite directions and at different rotation speeds.

13. The time display structure according to claim 12, wherein the gear reducer set comprises a first transmission gear, a second transmission gear, a third transmission gear and a fourth transmission gear; the first transmission gear is connected to the first driving motor; the second transmission gear, the third transmission gear and the fourth transmission gear are in sequential transmission; the outer barrel is coaxially connected to a sixth transmission gear, the inner roller is coaxially connected to a fifth transmission gear, the third transmission gear is fitted with the fifth transmission gear, and the fourth transmission gear is fitted with the sixth transmission gear; and by a transmission ratio between the third transmission gear and the fifth transmission gear and a transmission ratio between the fourth transmission gear and the sixth transmission gear, the outer barrel and the inner roller rotate in opposite directions and at different rotation speeds.

14. A timepiece, comprising a movement, wherein the movement comprises a time display structure, the time display structure comprises an outer barrel and an inner roller, the inner roller is provided in the outer barrel, the inner roller comprises a rotating rod and a plurality of rotating wheels, the plurality of rotating wheels are provided on the rotating rod at intervals, each of the rotating wheels is provided with numbers, the numbers of the plurality of rotating wheels are different and there are twelve numbers in total, and the outer barrel is used for displaying a number on the inner roller.

15. The timepiece according to claim 14, wherein the time display structure further comprises a driving device, the driving device is respectively connected to the inner roller and the outer barrel, and the driving device is capable of driving the outer barrel and the inner roller to rotate in opposite directions and at different rotation speeds, so that different numbers on the inner roller are capable of coinciding with windows on the outer barrel at different times and only one number is displayed in each window.

16. The timepiece according to claim 15, wherein the movement further comprises a lead screw structure; the timepiece further comprises a frame; the outer barrel, the inner roller, the driving device and the lead screw structure are all provided on the frame; the outer barrel is provided with the windows at positions corresponding to the plurality of rotating wheels, respectively; the rotation angle between two adjacent windows is 90°; the windows of the outer barrel coincide with the numbers of the inner rollers and only one number is displayed by each window and the frame; and the lead screw structure is capable of indicating time.

17. The timepiece according to claim 16, further comprising a light reflection sensor, wherein a light-blocking end cover is provided at an end of the outer barrel, a hole is formed in the light-blocking end cover, a light-blocking sheet is provided at an end of the inner roller, a notch is provided on the light-blocking sheet, and the light reflection sensor is capable of receiving light reflected by the light reflection sensor through the notch.

18. The timepiece according to claim 16, wherein the lead screw structure comprises a second driving motor, a lead screw and a pointer nut; the pointer nut is sleeved on the lead screw; the second driving motor is capable of driving the lead screw to rotate, the lead screw drives the pointer nut to move, the second driving motor is capable of performing reverse rotation, and the pointer nut is capable of indicating time.

19. The timepiece according to claim 16, wherein the frame is provided with a time indication scale, and the corresponding numbers are marked on the indication scale.

20. The timepiece according to claim 16, wherein the frame is mounted within a watch housing, the watch housing is capable of covering the movement, and a watch band is also provided on the watch housing.

* * * * *